3,053,666
PROCESS FOR MAKING YEAST LEAVENED BAKERY PRODUCTS AND COMPOSITION THEREFOR

Richard G. Henika, San Anselmo, and
Nelson E. Rodgers, Larkspur, Calif.
No Drawing. Filed Jan. 19, 1962, Ser. No. 167,411
16 Claims. (Cl. 99—90)

This invention relates generally to processes for the manufacture of commercial yeast leavened bakery products such as bread, rolls, buns, sweet goods and the like. Also it pertains to compositions for use in preparing doughs for such products. This application is a continuation-in-part of our copending application, Ser. No. 723,122, filed March 24, 1958, now abandoned.

Conventional dough for the manufacture of leaven bread employs such ingredients as cereal flours, water, yeast, yeast food, salt, sugar, malt, milk solids, shortening and softeners, such as mono- and diglycerides. As a source of milk solids, it is common to use nonfat dry milk. Conventional processing operations to prepare loaves ready for baking include mixing, fermentation, dividing, rounding, intermediate proofing, molding, panning and final proofing. Fermentation with simultaneous aging of the dough serves to develop the desired bread properties such as loaf volume, grain quality, texture and flavor. As will be presently explained, conventional processes also depend upon a fermentation period to develop certain dough properties such as short mix time, proper, extensibility, viscosity and relaxation required for effective machine processing.

At present, there are two generally accepted methods for preparation of a bread dough suitable for dividing and subsequent processing, namely, the "straight dough" method, and the "sponge dough" method.[1] In the straight dough method, all of the ingredients are mixed together as a single batch. Mixing is continued until the dough assumes a smooth appearance and acquires an elastic character. Fermentation starts during mixing and continues during subsequent operations until arrested in the final stages of baking. Fermentation for about 2½ hours before dividing is relied upon in the straight dough process to develop certain characteristics that are essential for further effective processing and for the production of bread to desired high quality standards.

The sponge dough method involves mixing part of the ingredients to form a sponge which is then fermented. Subsequently, the sponge is mixed with remaining dough ingredients for further processing. For example, the sponge dough may incorporate from 50 to 75% of the total flour of the complete dough, yeast, the yeast nutrients, the malt, and sufficient water to yield a moderately stiff dough. It may also contain a part of the milk solids, sugar and shortening. After mixing, the dough ferments for about 4 hours until it has attained a proper degree of maturity or ripeness. The fermentation time may, for example, range from 3.5 to 5 hours. To prepare a dough batch, using such sponge dough, the fermented sponge is returned to the mixer together with the balance of the ingredients, including the remaining flour and water, milk solids, salt, sugar, shortening, and any additional ingredients required by the formula. After optimum mixing, the dough is allowed to relax in dough troughs on the floor for from ½ to 50 minutes before dividing. Bun doughs are processed immediately after mixing has ended while bread doughs are processed usually from 10 to 50 minutes after mixing has ended, the optimum being 20 to 40 minutes for white bread. This short relaxation period is called "floor time."

The sponge dough method is advantageous in that the fermented sponge can be variably aged before mixing the final dough without adversely affecting the properties of the remixed dough. Although, as with the straight dough method, the remixed sponge dough must be used promptly when matured, the tolerable variation in sponge fermentation time affords better flexibility in bakery schedules than the straight dough method. The sponge dough properties are such that dough can be processed rapidly by high speed machinery instead of by hand. Also the finished bread has higher volume, a better grain and texture and longer keeping quality than straight dough bread. For these reasons, the sponge dough process has been widely adopted in the larger commercial bakeries.

In recent years, two additional methods have been used which use a preliminary fermentation step to develop characteristics essential for further effective processing. In one such method, instead of preparing a fermented sponge, a liquid brew is prepared from some of the dough ingredients, including a part of the yeast, yeast food, sugar and a buffering agent, often milk solids. This liquid material is fermented for a period of from 4 to 6 hours to form a master brew. Properly measured portions of this brew are mixed with the remaining dough ingredients, and then machining and proofing operations are carried out after a short floor time (i.e.,) ½ to 50 minutes) as in the sponge dough method.

Another recent method involves preparation of a number of individual brews, each fermented about 2.5 hours, and incorporation of the individual liquid batches with remaining ingredients in special high speed mixing equipment, for example, as in Baker Patent 2,953,460. Such mixing apparatus mixes the ingredients and develops the dough in a short time and extrudes the dough continuously into pans after mixing. The panned dough is proofed immediately, no conventional divider, rounder, or moulder being used. In both latter methods, fermentation in the brew is relied upon to develop certain essential characteristics.

In all of the foregoing methods, various amounts of an oxidizing agent, such as potassium bromate, may be employed to increase the gas retention properties of the dough and to provide good grain quality in the final baked product. The optimum amount of bromate varies inversely with fermantation time and dough acidity, and directly with the protein content (i.e., strength) of the flour and the amount of nonfat milk solids. Some bromate may be associated with the flour, because of its use during flour milling, and additional amounts may be added to the dough mix in the form of yeast food.

To summarize the above, all of the foregoing methods are characterized by subjecting all or a part of the ingredients to a preliminary fermentation period for the purpose of developing certain dough characteristics prior to dividing the dough into individual units for make-up, proof and bake. While some prior methods are more flexible than others, none of the accepted methods are as flexible as is desired. It is the reliance upon a preliminary fermentation period which detracts from the flexibility of these methods.

In general, the period consumed by yeast fermentation in bread making performs four important functions. Commencing immediately with dispersion of the yeast in the dough, production of carbon dioxide continues through all phases of dough processing. Within limits, the amount of carbon dioxide produced early in the process is not important, because it is deliberately expelled prior to dividing in the case of buns, molding in the case of conventional bread, and extruding in the case of continuous-mix

[1] See "Baking Science and Technology," by E. J. Pyler, Siebel Publishing Co., vol. II, 1952, pp. 388–391.

bread or extruded sweet goods. However, at these times, the rate of carbon dioxide production must have accelerated to a level that is high and relatively constant. It must be high to give the required loaf volume and constant so that doughs of progressively increasing time associated with machining will yield loaves of uniform volume.

Secondly, fermentation, especially during the proof period, provides a part of the flavor and aroma of bread, due to certain products of yeast metabolism.

A third function of fermentation is to produce substances and make environmental changes to assist modification of the flour proteins whereby the cell walls can retain the carbon dioxide produced. When an attempt is made to eliminate preliminary fermentation with the prior methods, the absence of such substances and environmental changes serves to increase the mixing time, and to cause poor extensibility. The property of extensibility affects the ability of the dough to be sheeted out or extruded easily without losing its structural properties. Presumably this is due to breaking the gluten cross linkages without altering the longitudinal protein strands. Apparently preliminary fermentation produces such an environment that the gluten proteins in the mixed dough maintain optimum extensibility and reach optimum carbon dioxide retention during machining, proofing and baking. These effects are much more pronounced when all or a major part of the flour proteins are subjected to fermentation in a sponge or dough rather than a liquid brew.

In addition to the foregoing, the period of preliminary fermentation is known to affect dough consistency. The ease with which a dough can be put through the divider, the rounder and molder, depends, among other things, upon the stiffness or consistency of the dough. Preliminary fermentation decreases dough consistency because it allows the amylases to hydrolyze the damaged starch. The damaged starch without hydrolysis binds water and increases dough consistency excessively.

In general, it is an object of the present invention to provide a new bread making process in which optimum dough and bread characteristics are developed in a novel manner.

Another object of the invention is to provide a novel process of the above character which affords a dough having proper extensibility at the time of machining, without causing undesirable characteristics.

Another object of the invention is to provide a process of the above character which makes possible a rate of carbon dioxide production which is high and constant at molding or extruding, together with good gas retention, thus providing good grain quality and loaf volume.

Another object of the invention is to provide a process of the above character which provides a dough having short mixing requirements.

Another object of the invention is to provide a process of the above character which is relatively simple with respect to the number of operations required, and which effects economies by reducing the overall time, equipment and space required for the complete process, and by providing good flexibility.

A further object of the invention is to provide a process of such character that is adapted to use in special high speed mixing equipment wherein the rapidly developed dough is extruded continuously following mixing, and immediately proofed and baked.

Another object of the invention is to provide a process in which the formulation is such that a reducing agent provides for shortened mixing time and optimum extensibility of the dough and, in combination with an oxidizing agent, for optimum gas retention and grain quality of the final baked product.

Another object of the invention is to provide bakery products of high quality produced by our process.

Another object of the invention is to provide a novel composition of a matter consisting of dry whey solids incorporated with both reducing and oxidizing agents, the composition being particularly adapted for the subject process.

Further objects and features of the invention will appear from the following description in which the preferred embodiments have been set forth in detail.

The present invention is predicated on our discovery that certain activating agents can be introduced into bread and roll mixes to develop essential dough characteristics independently of aging steps and in a substantially reduced fermentation time. The characteristics developed in this manner include a short mixing time, optimum dough consistency and optimum dough extensibility. In addition we have discovered that the reactions of certain oxidants can be combined with those of the activating agents to mature and age the activated dough to achieve optimum gas retention, again in the absence of a prolonged fermentation step. Since an aging step is not relied upon to develop the desired characteristics, the ivention permits a relatively short relaxation period or "floor time" prior to dividing with conventional bread mixing and make-up equipment, and requires no relaxation period after mixing with conventional bun equipment or continuous mix bread equipment. We prefer to use dried whey as the milk ingredient in such processing, in place of the customary skim milk solids, because whey facilitates production of adequate and constant loaf volume in a short fermentation period.

While producing bread of equivalent quality, our process provides economies over a sponge processed bread, due to elimination of a mixing step and a prolonged fermentation requiring extensive dough trough capacity. With respect to conventional straight dough processes, the mixing and machining qualities of the dough made by our process are far superior, the quality of bread is improved and the fermentation period is greatly reduced with concomitant savings in time and trough facilities. With respect to brew processes with conventional mixer and make-up equipment or continuous mix equipment, our process eliminates or greatly reduces the liquid brew fermentation step, decreases mix time and energy required to mix the dough, increases extensibility and gas retention and yields a higher quality loaf of bread. Since the mixing and machining operations are separated by a relatively short time, the flexibility with respect to coordinating these operations is superior to that of a sponge process. Although a sponge dough affords considerable flexibility with respect to age at which it can be remixed, nonetheless, changes in quality of dough do occur with time. Consequently, our process, by eliminating a variably aged sponge step, affords greater uniformity of dough characteristics in finished bread within a dough batch and between batches.

As activating agents, we employ certain reducing compounds, particularly a compound selected from the group consisting of L-cysteine hydrochloride, glutathione and sodium bisulfite. All of these compounds are sulphur-containing type reducing agents. They are nontoxic and do not form any toxic or otherwise objectionable byproducts with other ingredients of the mix. They have no detrimental effect upon flavor, nutritive value or other essential properties of the final product. Small amounts of one or more of these agents have been found to accelerate development of proper dough consistency and to improve extensibility. Compounds related to or homologous with L-cysteine hydrochloride can be used, such as D and DL cysteine hydrochloride, the free bases of L and D and DL cysteine, L-cysteine monophosphate, di-L-cysteine sulfate and L-mono-cysteine tartrate. Homocysteine is likewise related to the foregoing compounds, and can be used. Various sulfite salts, such as potassium bisulfite and sodium or potassium sulfite can be used in place of sodium bisulfite. Also, related compounds, such as hydrosulfite and pyrosulfite salts may be employed.

Natural foods such as inactive dry yeast, unheated soy flour, etc., may also be used as sources of cysteine and/or glutathione.

The chemistry involved in obtaining such results by the use of these agents is not clearly understood, but presumably the effect is associated with reducing properties. However, many other common reducing agents which we have attempted to use, such as ferrous and stannous salts, thiosulfate, thiocyanate, hydrazine hydrate, ascorbate, and the like do not have the desired effect upon mixing time and extensibility. Such compounds as thioglycollate reduce mixing time, but do not obtain the desired extensibility. Hydroquinone improves extensibility but has little, if any, effect upon mixing time. Certain sulfhydryl blocking reagents also show some of these effects.

As maturing agents, we employ conventional oxidizing agents such as potassium bromate, potassium iodate, calcium peroxide, and potassium persulfate, although at levels 5 to 10 times the usual amounts. Although the role of oxidants in conventional bread and bun making systems has been intensively studied for more than 25 years, the mechanism is still not understood. The prior art does teach that fermentation periods may be reduced slightly by increasing the bromate level but in all cases, fermentation is the primary means for maturing or aging the dough and bromate simply helps it. In our process, mixing a dough without a fermentation period and using our activating agents without or with only conventional levels of bromate gives a dough with optimum extensibility and development but little or no gas retention, i.e., the finished bread has very low volume and very poor grain quality. However, when bromate or other oxidant is introduced in percentages above levels used in prior practice together with cysteine or like activating agent in the amounts hereinafter specified, we can obtain both optimum extensibility and optimum gas retention, with good loaf volume and grain quality.

As previously noted, small amounts of bromate have been used in conventional processes for increasing gas retention. For example, assuming that bromate is used in flour milling, the fluor may contain about 0.0001 to 0.0005% of potassium bromate. The yeast food employed may contain additional amounts of bromate whereby in the dough mix the over-all amount of potassium bromate may range from about 0.0001 to 0.002% of the flour content. This twenty-fold range is due to differences in flour, fermentation conditions, mixing equipment, floor time, type of formula, and type and kind of product. A straight dough bread may have 0.0001% bromate, a sponge dough bread 0.002%.

In our process, we use much higher levels of oxidant, ranging from 0.002 to 0.020% of the flour content. Here again, the amount depends upon the particular flour, the mixing and make-up equipment, the floor time and the type of product. A retail-type white bread made up by hand with a soft flour might need only 0.002 to 0.003% bromate or its equivalent in other oxidant. A white bread made by our process (e.g., in a wholesale shop formerly using the sponge and dough method) might use 0.0045% of oxidant, for example, at a dough temperature of 84° F. and a floor time of 40 minutes, or 0.0060% at a dough temperature of 82° F. and a floor time of 30 minutes. For buns 0.0060% of oxidant at a dough temperature of 82° F. and no floor time might be employed. Levels of 0.0100 to 0.0125% bromate and iodate have been used in conventional mix equipment in the making of bread, without any floor time or make-up equipment.

Reference has been made to the use of nonfat milk solids (i.e., skim milk powder) in prior processes, and to the fact that we prefer, in place of such milk solids, to use dry whey solids. One commercial process for the manufacture of a satisfactory whey powder involves evaporating the raw whey, such as whey resulting from the manufacture of Cheddar, Swiss and/or cottage cheese to produce a concentrate containing from 30 to 55% solids, followed by spray drying. Spray drying as disclosed in Patent 2,088,606 may be employed to provide a non-hygroscopic powder.

Use of whey (especially blends of cottage cheese whey with Cheddar and/or Swiss) instead of nonfat milk solids tends of itself to permit a reduction in fermentation when employed in the straight dough process. Whey also increases the extensibility of the dough and gives proper consistency without adding excessive water. However, when whey is used without cysteine and bromate, the results are unsatisfactory because the dough requires too long to mix and optimum extensibility is not reached. When used together with activating and oxidizing agents (e.g., cysteine and bromate), the combined effects provide a greatly reduced mixing time, while at the same time providing the other desired properties, including a marked reduction in fermentation time before dividing, together with optimum extensibility and gas retention.

Assuming the use of whey solids with the above activating agents, the time required to mix the dough to proper consistency can be reduced from 20 to 75% of the time required when the activating agents are not employed.

Although whey is preferred as the milk ingredient because it consistently permits use of a short fermentation time, some lots of nonfat dry milk (e.g., spray dried skim milk powder) can be used satisfactorily. Due to some unknown variability, certain samples of nonfat dry milk unduly prolong the fermentation time required to attain the high and relatively constant gas evolution necessary for uniform loaf volume and grain quality. Thus, although it may be necessary to select the nonfat milk for proper performance, such an ingredient is within the scope of certain of the annexed claims.

The following table sets forth operable ranges of activating agent and bromate expressed as percent of flour.

| Dough additive: | Operable range, percent of flour |
|---|---|
| Cysteine HCl | .002–.020 |
| Potassium bromate [1] | .002–.012 |
| Glutathione | .002–.025 |
| Potassium bromate [1] | .002–.010 |
| Sodium bisulfite | .002–.015 |
| Potassium bromate [1] | .002–.013 |

[1] Amount of additional potassium bromate associated with specified activating agent, not including about 0.0025% ordinarily contributed by flour and yeast food.

In instances where substantial variations are encountered in the strength (i.e. protein content) of the flour, the amounts of activating and oxidizing agents should be adjusted accordingly.

The amount of dry whey solids employed can correspond generally to the percentage of nonfat dry milk solids commonly used in standard bread formulas. In general, acceptable bread formulas may use from about 2 to 6% of the whey solids, with about 4% being preferred.

Although not essential, it is preferable to use the milk solids content as a vehicle for introducing part or all of the activating agent. Also it is desirable to use it as a vehicle for part or all of the oxidizing agent. Assuming the use of dry whey powder, as previously described, the activating agent in dry powdered form can be homogeneously mixed with the same. Assuming that the oxidizing agent is likewise incorporated in the whey powder, care should be taken to avoid interaction, such as would impair their activities. One procedure which can be used is to separately intermix the activating and oxidizing agents with the whey powder. For example, the activating agent can be first intermixed, and thereafter the oxidizing agent added. Also interaction can be minimized by separately blending each agent with different portions of whey powder, and subsequently combining the separate blends. Association with different whey particles thus affords physical separation. It is also possible to coat either the activating or oxidizing agent, or both, with a suitable water soluble protective substance, such as gelatin, carboxymethyl cellulose, vegetable gum, or a water dispersible wax, before blending the same with the whey powder. Instead of forming a dry mix, it is possible to introduce the activating agent, such as cysteine, with a whey concentrate before spray drying, although in this instance some additional amounts of the reducing agent should be used to compensate for oxidation losses during processing.

The product described above consisting of whey powder as a vehicle which homogeneously incorporates the activating agent, or preferably both the activating agent and the oxidizing agent, is highly advantageous to the bakery trade. It makes it possible for commercial bread establishments to procure a product having the activating and oxidizing agents in predetermined optimum proportions, thus avoiding complex adjustments of the agents by the bakery, which would be impractical.

As previously mentioned, the amounts of activating and oxidizing agents should be adjusted in accordance with flours of different strength, type of equipment, floor time and product. The baker can compensate for such variations by adjusting the dough formula to include more or less of the whey product containing these ingredients. Bread dough formulas are not critical with respect to the amount of milk solids employed and, therefore, dried whey is uniquely fitted as a vehicle for the activating and oxidizing agents. For example, assuming that a dried whey contains 0.15% cysteine and 0.05% potassium bromate, when incorporated in a bread dough in an amount equal to 4% of the flour content, the dough will contain 0.006% activating agent and 0.002% oxidizing agent. Varying the whey content to compensate for variations in the flour strength, in a range of from 2 to 6% of the flour content, provides levels of 0.003 to 0.009% (of the flour content) activating agent and 0.001 to 0.003% oxidizing agent. The amount of conventional yeast foods containing additional oxidizing agent(s) may be varied to further extend the range of oxidizing agent without changing the level of reducing agent.

As a practical matter, and taking into account the permissible variations outline above, the dried whey composition may contain from 0.033 to 1.25% of the activating agent, and from 0.017 to 0.4% of the oxidizing agent.

In instances where it may be desired to separately introduce the oxidizing agent, the activating agent can by itself be incorporated with the whey content, and the oxidizing agent introduced into the mix together with the other ingredients, in the amounts required. Assuming the use of potassium bromate, the amount added may be over and above the amounts contained in the flour, and amounts which may be included in the yeast foods.

The foregoing refers to the use of a bromate salt like potassium bromate as a suitable oxidizing agent. It is possible to use other oxidizing compounds or combinations thereof having effects similar to potassium bromate, such as potassium iodate, potassium persulfate, chlorine dioxide, benzoyl peroxide and calcium peroxide, provided, however, that in relation to activity the concentration of such other agents is adjusted to be compatible with the activating agent.

In general, to carry out the present process with conventional mixing and make-up equipment, all of the dough ingredients, including the flour, whey, activating and oxidizing agents, are mixed together in a single mixing operation. No preceding sponge or dough fermentations need be employed. While the exact mixing time varies with type of mixer, flour, and type of yeast raised goods, it is usually much shorter than the time required for mixing a comparable straight dough and equal to the time required for remixing a comparable sponge dough. Generally this is less than 20 minutes, and of the order of 8 to 12 minutes for conventional flour in white bread.

Following mixing, the dough may be processed immediately (e.g., within ½ minute) as for example in making hamburger, hot dog and/or Parker House rolls, or it may be given a short relaxation time, 10–30 minutes, in processing sweet goods or retail bread, both being made up by hand, or it may be allowed to relax up to 50 minutes in making wholesale white and variety breads. A preferred relaxation time for the wholesale bread is 20 to 40 minutes. Here again, the exact floor or relaxation time depends upon the flour, type of yeast-raised item, the yeast level, the make-up equipment and the dough temperature.

With conventional mixing and make-up equipment, it should be emphasized that the floor or relaxation time of our process it not intended to ferment the dough and condition it with fermentation by-products as the much longer 2½ hour straight dough fermentation step does. Rather our relaxation or floor time gives the yeast cells a chance to reach a high and uniform gassing rate prior to make-up, thus insuring uniformity of product with the batch method. Also the activated dough relaxes physically to permit better machining. In those instances where there is no relaxation or floor time step, as in making buns with conventional high speed dividing and make-up equipment, the yeast cells may be slurried with sugar and water for a period long enough to reach a high and uniform gassing rate before mixing. This normally requires 15–30 minutes, much less time than a 2½ to 6 hour liquid brew step.

After the doughs have been processed into individual units by dividing, rounding, overhead-proofing and molding, they are proofed and baked as usual.

In carrying out the present process with continuous mixing and developing equipment, the yeast cells may be slurried with sugar and water just long enough to reach a high and uniform gassing rate. Then all dough ingredients including whey, activating and oxidizing agents are mixed to the desired development. The time and/or energy required is decreased compared to doughs mixed without our activating and oxidizing agents. Since most doughs are then extruded immediately after developing (e.g., following a relaxation period of the order of 1 second), there is no floor or relaxation time.

The dough obtained in accordance with our process has mixing and machining characteristics equal to or better than that obtained by the sponge dough methods. The finished bread had a loaf volume equal to conventional bread, and has symmetry, color, grain texture, softness and flavor equal to or better than the best commercial bread.

In the following examples of our invention, all concentrations of ingredients are expressed as percent of the flour.

EXAMPLE 1.—LABORATORY BAKING TEST

*Dough Formula*

| | Grams | Percent |
|---|---|---|
| Flour (bromated, bleached bakers) | 1,400 | 100 |
| Sugar | 56 | 4.0 |
| Shortening | 42 | 3.0 |
| Salt | 21 | 1.5 |
| Yeast | 35 | 2.5 |
| Yeast food (Arkady type) | 10.5 | .75 |
| Dried whey | 70 | 5.0 |
| L-cysteine hydrochloride | .07 | .005 |
| Potassium bromate [1] | .0385 | .00275 |
| Water | 984 | 70.3 |

[1] Total bromate 0.005%, including 0.00225% from yeast food.

PROCEDURE (1) The dry ingredients were mixed with water for 0.75 minute on low speed and 6.5 minutes on medium speed, using a Hobart A-200 mixer with 20-quart bowl and dough hook. The dough temperature out of the mixer was 86° F.

(2) The dough was divided into four 510-gram aliquots and given floor times of 20, 35, 50, and 65 minutes respectively at 86° F.

(3) The divided dough masses were rounded on a floured table top and given 10 minutes intermediate proof at 84° F.

(4) The rounded masses were molded with a Thompson one-man loaf molder, with top rollers spaced 9/32 inch apart.

(5) The loaves were proofed for 60 minutes at 95° F., in an atmosphere at 85 percent relative humidity.

(6) The proofed loaves were baked for 22 minutes at 455° F. in a Despatch revolving oven.

(7) After baking, the loaves were cooled for 20 minutes, loaf volume measured by rapeseed displacement, and stored overnight in closed cabinet.

(8) The loaves were judged for symmetry, crust, color, grain, and other crumb qualities the next day. Grain quality was measured against a set of permanent grain standards, chosen to give various grain quality values between 3 (very poor) and 10 (excellent). The best commercial wholesale breads have grain qualities equal to 7–9 with an occasional 10 on this scale.

RESULTS

The loaf volumes and grain quality values obtained at varied floor tmies in the foregoing example were 2305, 2470, 2460, and 2520 cc. and 10.2, 10.0, 9.6 and 7.8, respectively. Their symmetry and crust color were excellent. Texture was soft and velvety. Taste and aroma were very good.

Conventional sponge breads made at the same time ran 2200, 2225, 2205, and 2210 cc. loaf volume and 8.4, 7.8, 8.4 and 5.5, grain quality. Breads made following the sponge formula and procedure, except that the sponge step was omitted, had less than 1700 cc. volume and 5.0 grain quality.

EXAMPLE 2.—COMMERCIAL BAKING TEST

*Dough Formula*

|  | Pounds | Percent |
|---|---|---|
| Flour (bromated, bleached, bakers, 12.1% protein, 61.5% absorption) | 200 | 100 |
| Sugar | 10 | 5.0 |
| Lard | 6 | 3.0 |
| Salt | 3 | 1.5 |
| Yeast | 5.5 | 2.75 |
| Enrichment, 2 tabs. |  |  |
| Softener (mixed mono- and diglyceride) | 1.5 | 0.75 |
| Yeast food (Arkady type) | 1 | 0.5 |
| Spray dried whey product [1] | 10 | 5.0 |
| L-crysteine hydrochloride from whey product | 0.01 | 0.005 |
| Potassium bromate [2] | 0.007 | 0.0035 |
| Water | 136 | 68.0 |

[1] Spray dried whey dry blended with 0.1% L-crysteine hydrochloride.
[2] Total bromate 0.005%, including 0.0015% from yeast food.

PROCEDURE (1) The dry ingredients were mixed 1 minute at low speed. Then mixing was continued for 9 minutes at medium speed. The dough temperature out of the mixer was 87° F.

(2) The mixed dough was given a floor time of 35 minutes.

(3) The dough was then subjected to conventional dividing, rounding, 12-minute overhead proof, and conventional molding.

(4) The molded loaves were proofed for 71 minutes at 105° F.

(5) The proofed loaves were baked for 123 minutes at 425° F.

(6) The bread was cooled, sliced, and wrapped as usual.

(7) Samples were scored immediately after cooling and again at 5 days.

RESULTS

The consistency and extensibility out of the mixer were equal to conventional sponge dough.

The fermentation or floor period of 35 minutes was equivalent to that of a commercial dough process.

The finished bread had a loaf volume of 2800 cc. per pound compared to sponge bread volume of 2700 cc. The grain quality was excellent (size of cell was small and uniform, shape oval, cell wall thin), texture was very soft, and the bread showed excellent keeping quality for 5 days. Taste and aroma, while not quite as "sour" to an expert taster, had more desirable fermentation overtones and were preferred to that made by the sponge process. The toasting quality was very good.

EXAMPLE 3.—COMMERCIAL BAKING TEST

*Dough Formula*

|  | Pounds | Percent |
|---|---|---|
| Flour (same as Example 2) | 500 | 100 |
| Sugar | 30 | 6.0 |
| Lard | 15 | 3.0 |
| Salt | 7.5 | 1.5 |
| Yeast | 14.0 | 2.8 |
| Yeast food | 3.75 | 0.75 |
| Softener (mono- and diglyceride) | 2.5 | 0.50 |
| Enrichment, 5 tabs. |  |  |
| Spray dried whey | 25.0 | 5.0 |
| L-crysteine hydrochloride | 0.04 | 0.008 |
| Potassium bromate [1] | 0.0188 | 0.00375 |
| Water | 335 | 67.0 |

[1] Total bromate 0.006%, including 0.00225% from yeast food.

PROCEDURE (1) Using the same equipment as in Example 2, the dough was mixed for 1 minute on low and 10 minutes on second speed. The temperature out of the mixer was 88° F.

(2) The dough was given 28 minutes' floor time.

(3) The dough was then divided, rounded, overhead proofed for 12 minutes, and molded.

(4) The molded loaves were proofed 65 minutes at 113° F. and at 85 percent relative humidity.

(5) The proofed loaves were baked for 25 minutes at 400° F.

(6) Cooling, slicing, wrapping and scoring were as in Example 2.

RESULTS

The development out of the mixer and at machining time was excellent. The machining properties were very good, the dough sheeting cut very easily and fine and the shaped pieces were very uniform.

The loaf volume was normal, symmetry very good, grain quality excellent (small, uniform, oval-shaped cells with thin cell walls), texture soft and velvety, crumb color very good, flavor excellent, and softness and keeping quality unusually good.

The machining time was 12½ minutes. By carefully tagging 3–4 doughs every 2.0 minutes and measuring the loaf volume and grain of the finished bread, it was possible to measure the fermentation tolerance of the dough (i.e., stability of the dough and bread properties during machining). Loaf volume varied no more than 28 minutes floor time (youngest doughs) to 40 minutes (oldest doughs) than variation between loaves taken from the same floor time. This demonstrated that constant and high gas production had been attained and synchronized with optimum gas retention. Although all the bread had excellent grain quality, there was a slight indication that the optimum occurred around 30 minutes. This showed that a floor time of 23–25 minutes would have been adequate.

The total time from start of mixing to the last bread out of the oven for 2 hours and 33 minutes compared to the conventional sponge time under the same conditions and with the same equipment of 6 hours and 34 minutes.

EXAMPLE 4.—COMMERCIAL BAKING TEST

*Dough Formula*

The same as Example 3 except that the total bromate was .005 percent instead of .006 percent.

PROCEDURE

The same as Example 3 except that the dough temperature out of the mixer was 91° F. instead of 88° F., the floor time was 23 minutes instead of 28, and the proof time was 53 minutes instead of 65.

RESULTS

The dough and bread properties were similar to that obtained in Example 3, being equal or supreior to the sponge bread. The total time, from start of mixing to the last loaf out of the oven, was 2 hours and 15 minutes.

EXAMPLE 5.—COMMERCIAL BAKING TEST

The formula, procedure, and results were as in Example 3, except that L-cysteine hydrochloride and the potassium bromate were dry blended with the whey powder. In blending, the cysteine was first added and mixed with the whey, after which the bromate was added and intermixed.

EXAMPLE 6.—COMMERCIAL ENRICHED HOT DOG BUNS

Dough Formula

|  | Pounds | Percent |
| --- | --- | --- |
| Flour | 200 | 100 |
| Water | 132 | 66 |
| Yeast | 11 | 5.5 |
| Yeast food (Fermaloid type) | 2 | 1.0 |
| Sugar | 22 | 11.0 |
| Lard | 10 | 5.0 |
| Salt | 4 | 2.0 |
| Emulsifier | 4 | 2.0 |
| Dry whey product [1] | 10 |  |
| Whey |  | 5.0 |
| L-cysteine |  | 0.010 |
| Potassium bromate |  | 0.0035 |
| Enrichment, 2 tabs |  |  |
| Calcium propionate | 0.5 | 0.25 |

[1] Containing 99.73% dry whey, 0.20% L-cysteine HCl and 0.07% KBrO$_3$.

PROCEDURE (1) Mix ingredients 2½ minutes on low and 12 minutes on high speed on Read horizontal bread mixer. The dough temperature was 80° F.

(2) The dough was taken directly to the Readco vacuum bun divider-rounder and divided.

(3) It was immediately molded on a Thompson hot-dog molder.

(4) It was then proofed and baked as usual.

RESULTS

Dough and baked bun characteristics were comparable to those made by sponge and dough process, using a sponge fermentation time of 4 hours and no floor time after mixing the dough.

EXAMPLE 7.—LABORATORY BREAD WITHOUT FLOOR TIME, ROUNDING, OVERHEAD AND MOLDING

Formula

|  | Grams | Percent |
| --- | --- | --- |
| Flour | 600 | 100 |
| Water | 341 | 62 |
| Yeast | 24 | 4 |
| Sugar | 36 | 6.0 |
| Salt | 12 | 2.0 |
| Lard | 18 | 3.0 |
| Emulsifier | 3 | 0.5 |
| Dry whey product [1] | 36 |  |
| Whey |  | 6.0 |
| L-cysteine hydrochloride |  | 0.012 |
| Potassium bromate |  | 0.0048 |
| Calcium acid phosphate | 2.18 | 0.38 |
| Potassium iodate | 0.0168 | 0.0028 |
| Calcium sulfate | 0.72 | 0.12 |

[1] Contained 99.73% whey, 0.20% L-cysteine HCl and 0.07% potassium bromate.

PROCEDURE (1) The yeast, 1 percent of the dry whey product and 1 percent of the sugar were slurried in all of the water for 20 minutes at 100° F.

(2) The dough was mixed in a conventional type laboratory mixer (Hobart mixer with McDuffy bowl) with the slurry and all remaining dry ingredients 1 minute on low speed and 6¼ minutes on medium speed. The dough temperature was 95° F.

(3) The dough was scaled at 500 grams immediately atfer mixing ended and placed in pans.

(4) It was proofed 56 minutes at 100° F.

(5) It was then baked 21 minutes at 450° F.

RESULTS

The loaf volume, grain, texture and flavor were comparable to that of a sponge and dough bread made with a sponge fermentation step of 4½ hours and a floor time of 25 minutes.

EXAMPLE 8.—LABORATORY BAKING TEST

Dough Formula

|  | Grams | Percent |
| --- | --- | --- |
| Flour (bromated, bleached, bakers) | 1,400 | 100 |
| Sugar | 56 | 4.0 |
| Shortening | 42 | 3.0 |
| Salt | 21 | 1.5 |
| Yeast | 35 | 2.5 |
| Yeast food (Arkady type) | 10.5 | 0.75 |
| Water | 984 | 70.3 |
| Spray-dried whey | 70 | 5.0 |
| Sodium bisulfite | 0.14 | 0.010 |
| Potassium bromate [1] | 0.105 | 0.0075 |

[1] Total bromate was 0.010%, including 0.0025% from yeast food.

PROCEDURE

The same as in Example 1, except that the mixing time was reduced to 4.5 minutes on medium speed.

RESULTS

Loaf volumes at 20, 35, 50, and 65 minutes were 2300, 2540, 2540, and 2690 cc. respectively. Grain qualities were 10.0, 10.3, 10.0, and 9.2, all equal to or better than conventional bread.

EXAMPLE 9.—EFFECT OF ACTIVATING AGENTS ON MIXING TIME AND EXTENSIBILITY

Dough Formula

|  | Grams | Percent |
| --- | --- | --- |
| Flour | 300 | 100 |
| Sugar | 12 | 4.0 |
| Shortening | 9 | 3.0 |
| Salt | 4.5 | 1.5 |
| Yeast | 7.5 | 2.5 |
| Dry whey | 15.0 | 5.0 |
| Water | 192.0 | 64.0 |
| Activating agent | ([1]) | ([1]) |

[1] Varied.

PROCEDURE (1) All ingredients were mixed in a Farinograph at 86.0° F. to peak dough consistency. The peak dough consistency of the control without an activating agent was 430 Brabender units and the others were within 20 Brabender units of the control.

(2) The time of peak dough consistency was measured and the reduction in mixing time compared to the control was calculated.

(3) The extensibility of the dough was determined by stretching the dough by hand at the peak dough consistency. The farther the dough could be extended before breaking, the greater the extensibility. An index of extensibility of from 2 to 4 was deemed satisfactory.

RESULTS

| Activating agent | Concentration, percent of flour | Time of peak dough consistency, minutes | Reduction in time to peak dough consistency, percent | Extensibility [1] |
|---|---|---|---|---|
| None | | 13.0 | | Poor |
| Sodium bisulfite | 0.001 | 10.25 | 21.2 | 1 |
| | 0.0025 | 8.75 | 32.7 | 2 |
| | 0.005 | 7.5 | 42.2 | 3 |
| | 0.010 | 4.75 | 63.5 | 4 |
| L-cysteine hydrochloride | 0.001 | 12.0 | 7.7 | 1 |
| | 0.0025 | 11.0 | 15.4 | 1 |
| | 0.005 | 8.0 | 38.4 | 2 |
| | 0.010 | 6.5 | 50.0 | 3 |
| | 0.015 | 5.25 | 59.5 | 4 |
| Glutathione | 0.005 | 9.25 | 28.9 | 1 |
| | 0.010 | 8.0 | 38.4 | 2 |
| | 0.015 | 6.25 | 51.8 | 3 |

[1] Increasing index value indicates increased extensibility.

EXAMPLE 10.—EFFECT OF WHEY WITHOUT CYSTEINE OR BROMATE

Dough Formula

| | Pounds | Percent |
|---|---|---|
| Flour (bromated, bleached, bakers) | 100 | 100 |
| Sugar | 4 | 4.0 |
| Lard | 4 | 4.0 |
| Salt | 1.5 | 1.5 |
| Yeast | 2.5 | 2.5 |
| Yeast food (Arkady type) | 0.75 | [1] 0.75 |
| Spray dried whey | 5.0 | 5.0 |
| Softener (mono-and diglyceride) | 0.25 | 0.25 |
| Fungal enzyme (amylase type) | 0.50 | 0.50 |
| Water | 70.0 | 70.0 |

[1] .00225% potassium bromate.

PROCEDURE (1) Using a conventional mixer, the dough was mixed for 20 minutes on medium speed, stopping every 4-6 minutes to observe development (consistency, extensibility). The temperature out of the mixer was 89° F.

(2) One third of the batch was given 43 minutes' floor time and the balance 67 minutes.

(3) The dough was divided, rounded, overhead proofed 8.5 minutes, and molded.

(4) The molded loaves were proofed 48 minutes at 118° F. and at 85 percent relative humidity.

(5) The proofed loaves were baked at 435° F. for 26 minutes.

RESULTS

The normal absorption for sponge dough with this flour, using 3 percent high-heat nonfat milk, was 65 percent and the dough mixing time was 11 minutes. With 20 minutes' mix time, substitution of whey solids for nonfat milk solids, and with 5 percent more water, the dough did not have the consistency or extensibility equal to a sponge dough, but was superior to a conventional straight dough.

The dough was more difficult to divide and mold than the regular sponge dough but easier than a conventional straight dough. The 43-minute (floor time) dough machined better than the 67-minute dough.

The finished bread had volume and grain quality approaching that of the sponge.

EXAMPLE 11.—EFFECT OF WHEY AND CYSTEINE WITHOUT OPTIMUM BROMATE

Dough Formula

| | Pounds | Percent |
|---|---|---|
| Flour (bromated, bleached, bakers, 12.2% protein, 64.5% absorption) | 200 | 100 |
| Sugar | 10 | 5.0 |
| Lard | 6 | 3.0 |
| Salt | 3 | 1.5 |
| Yeast | 5 | 2.5 |
| Yeast food | 1.0 | 0.5 |
| Spray-dried whey product [1] | 10.0 | 5.0 |
| L-cysteine hydrochloride from whey product | 0.015 | 0.0075 |
| Potassium bromate [2] | 0.003 | 0.0015 |
| Water | 138 | 69.0 |

[1] Spray dried whey blended with 0.15% L-cysteine hydrochloride.
[2] Total bromate 0.003%, including 0.0015% from yeast food.

PROCEDURE (1) Using the same equipment as in Example 2, the dough was mixed for 9 minutes on medium speed. The temperature out of the mixer was 84° F.

(2) After 35 minutes' floor time, the dough was divided, rounded, overhead proofed 8.5 minutes, and molded.

(3) The molded loaves were proofed for 65 minutes at 118° F. and at 85 percent relative humidity.

(4) The proofed loaves were baked at 460° F. for 23-24 minutes.

RESULTS

The consistency and extensibility of the mixed dough were excellent, and superior to sponge dough. The dough machined very well, better than a sponge dough.

The loaf volume was about 10 percent below normal conventional sponge bread. Grain and other crumb qualities were not as good as the poorest sponge bread. Flavor and crust color were very good. Thus while the activating agent gave good mixing and machining properties and developed the dough, the bromate level was not high enough to mature the dough to give it good gas retention properties.

EXAMPLE 12.—COMMERCIAL BAKING TEST

Additional commercial bakes were made at the same time as Example 3 in which the percentages of certain ingredients were varied as follows:

L-cysteine hydrochloride [1] _____ .005, .0075, and 0.10 percent.
Total potassium bromate _____ .003, .004, .005, and .006 percent.
Yeast _____ 2.5, 2.75, 2.8, and 3.0 percent.
Softener _____ .3, .5, and .75 percent.
Mixing time _____ 8, 9, 10, and 11 minutes.
Dough temperature out of mixer _____ 86, 87, 88, 89, 90, 91, and 92° F.
Floor time _____ 23, 28, 30, and 35 minutes.
Proof time _____ 53, 60, 63, 70, and 77 minutes.

[1] Provided as a dry blend with whey.

While some minor variations in dough quality and bread quality were experienced due to the above changes, no difficulties were experienced in machining the doughs and the final bread was considered equal to or superior to the conventional sponge type bread by the bakery production people. Specifically, the white bread made under these conditions gave best over-all results with .007-.010 percent cysteine hydrochloride, .005-.006 percent total bromate, yeast at 2.75 percent, mixing time of 8-9 minutes, dough temperatures of 86-88° F., floor times of 23-30 minutes, and proof times of 55 to 65 minutes.

EXAMPLE 13.—COMMERCIAL BREAD WITH CONTINUOUS MIX AND EXTRUSION EQUIPMENT

*Formula*

|  | Pounds | Percent |
|---|---|---|
| Flour | 750 | 100 |
| Water | 455 | 60 |
| Yeast | 22.8 | 3.0 |
| Yeast food | 3 | 0.4 |
| Sugar | 40 | 5.3 |
| Lard | 22.8 | 3.0 |
| Salt | 14 | 1.9 |
| Dry whey product [1] | 30 |  |
| Whey |  | 4.0 |
| L-cysteine hydrochloride |  | .008 |
| Potassium bromate |  | .0032 |
| Calcium acid phosphate | 4 | .53 |
| Calcium propionate | [2] 8 | .067 |
| Enrichment | [2] 10 | .07 |
| Potassium iodate |  | .0009 |
| Potassium bromate |  | .0061 |
| Total Oxidant |  | .0114 |

[1] As in Examples 6 and 7.  [2] Tabs.

PROCEDURE (1) The yeast was slurried with sugar for 25 minutes at 100° F.

(2) The slurry plus the other ingredients were continuously fed to a continuous mixer-developer unit of the type shown in Baker Patent 2,953,460, and the developed dough extruded into pans, proofed and baked.

RESULTS

The brew time was reduced from the 2½ hours ordinarily used to 25 minutes. The required speed and power of the motor driving the mixer-developer were reduced 10–15 percent with the L-cysteine product. The flavor, appearance, etc., of the finished bread with the L-cysteine product was comparable to the usual continuous mix bread.

EXAMPLE 14.—PREPARATION OF BREAD WITH ½ TO 50 MINUTES' FLOOR TIME

*Formula*

|  | Grams | Percent |
|---|---|---|
| Flour | 1,600 | 100 |
| Water | 1,072 | 67.0 |
| Yeast | 64 | 4.0 |
| Yeast food, (Fermaloid type) | 8 | 0.5 |
| Sugar | 80 | 5.0 |
| Lard | 48 | 3.0 |
| Salt | 32 | 2.0 |
| Dry whey product: [1] |  |  |
| Whey | 64 | 4.0 |
| L-cysteine hydrochloride | .128 | .008 |
| Potassium bromate | .11 | .0069 |
| Emulsifier | 8.0 | 0.5 |

[1] As in Examples 6 and 7.

PROCEDURE (1) The ingredients were mixed one minute on low speed and 12 minutes on medium speed using the Hobart mixer.

(2) The dough temperature was 86° F.

(3) The floor time was varied from the minimum time required for dividing and panning (about ½ minute) to 50 minutes.

(4) The doughs were rounded, given a 10 minute intermediate proof and molded.

(5) The doughs were proofed to constant height and baked 20 minutes at 440° F.

(6) The breads were scored for volume 10 minutes after cooling and then held overnight in a closed cabinet.

(7) The breads were scored for symmetry, grain quality, texture and flavor.

RESULTS (1) The doughs had excellent extensibility and machined and made up very well.

(2) The finished breads were comparable to sponge bread made with 4½ hour sponge fermentation step. Loaf volumes and grain quality scores were as follows:

| Floor time mins. | Loaf volume, cc/lb. | Grain quality, [1] units |
|---|---|---|
| None | 2,440 | 7.6 |
| 10 | 2,610 | 8.6 |
| 20 | 2,560 | 9.8 |
| 30 | 2,630 | 10.4 |
| 40 | 2,560 | 10.0 |
| 50 | 2,510 | 10.6 |

[1] A grain quality score of 7.0 or higher is acceptable for wholesale type, fine grain white bread.

EXAMPLE 15.—COMMERCIAL YEAST-RAISED DOUGHNUTS

*Dough Formula*

|  | Pounds | Percent |
|---|---|---|
| Flour | 16.0 | 100 |
| Sugar | 1.5 | 10 |
| Shortening (emulsifier type) | 1.6 | 10 |
| Salt | 0.2 | 1 |
| Yeast, compressed | 1.0 | 5 |
| Yeast food (Arkady type) | 0.12 | .75 |
| Water | 9.0 | 56.25 |
| Dry whey product [1] | 0.64 | 4.0 |
| Whey |  | 4.0 |
| L-cysteine hydrochloride |  | .0080 |
| Potassium bromate |  | .0032 |

[1] As in examples 6 and 7.

PROCEDURE (1) All dry ingredients were dry blended.

(2) All ingredients were then mixed in a 40-quart Hobart mixer for one minute on low speed and five minutes on third speed. The dough temperature was 88° F.

(3) The dough was given a 5-minute floor time.

(4) It was then hand-cut and proofed 45 minutes at 102° F. and 80 percent relative humidity.

(5) The raised doughnuts were then fried 45 seconds on each side at 385° F.

RESULTS

The doughnuts were similar in finished volume, texture, keeping quality, appearance (amount of fat penetration, color, etc.), and flavor to those made with the same formula using a 2½ hour straight dough fermentation method.

To those skilled in the art to which this invention relates, many different applications and embodiments of the invention will suggest themselves without departing from the spirit and scope of the invention. In general, however, we have determined that the process disclosed herein can be satisfactorily employed in producing most any type of yeast-raised bakery product. Thus, we have found it to be satisfactory for white bread; variety bread such as whole wheat, rye, raisin, honey-nut, etc.; crackers, such as soda crackers; sweet goods such as raisin and cinnamon rolls, Danish rolls; coffee cakes; yeast-raised doughnuts; and, in fact virtually all types of yeast-raised bread, buns and rolls. The particular examples set forth above were chosen to illustrate the essential processing under different conditions of formula, procedure, equipment and desired end product. Naturally it is not feasible to illustrate all possible variations by specific example, and the disclosures and description herein should consequently be considered as purely illustrative and not in any sense limiting.

We claim:

1. In a process for making yeast leavened bakery products, the steps of mixing essential dough ingredients including flour, water and yeast with about 0.002 to 0.025% by weight of the flour content of a gluten activating agent selected from the group consisting of cystein, glutahione and sufite salts and with about 0.001 to 0.01% by weight of the flour content of a gluten maturing agent selected from the group consisting of bromate, iodate and persulfate oxidizing salts, allowing the mixed dough to relax following said mixing for a period not exceeding about 50 minutes, and immediately thereafter subjecting the dough to machining operations to form individual units for proofing and baking, whereby optimum development, extensibility and gas retention is imparted to the mixed dough during mixing, machining, proof and baking.

2. A process as in claim 1 wherein said gluten activating agent is L-cysteine hydrochloride.

3. A process as in claim 1 wherein said gluten maturing agent is potassium bromate.

4. A process as in claim 1 wherein said dough ingredients include whey solids.

5. A process as in claim 4 wherein at least one of said gluten activating agent and said gluten maturing agent is homogeneously incorporated in said whey solids as a composition for introduction into the mix.

6. In a process for making yeast leavened bakery products, the steps of mixing essential dough ingredients including flour, water and yeast with about 0.002 to 0.025% by weight of the flour content of a gluten activating agent selected from the group consisting of cysteine, glutathione and sulfite salts and with about 0.001 to 0.01% by weight of the flour content of a gluten maturing agent selected from the group consisting of bromate, iodate and persulfate oxidizing salts, allowing the mixed dough to relax following said mixing for a relatively short period of the order of about 1 second to not in excess of about 50 minutes, and immediately thereafter subjecting the dough to machining operations to form individual units for proofing and baking, whereby optimum development, extensibility and gas retention is imparted to the mixed dough during mixing, machining, proof and baking.

7. In a continuous process for the manufacture of yeast leavened bakery products, the steps of mixing essential dough ingredients including flour, water and yeast with about 0.002 to 0.025% by weight of the flour content of a gluten activating agent selected from the group consisting of cysteine, glutathione and sulfite salts and with about 0.001 to 0.01% by weight of the flour content of a gluten maturing agent selected from the group consisting of bromate, iodate, and persulfate oxidizing salts, said mixing being independent of any aging step associated with fermentation and immediately thereafter subjecting the mixed dough to simultaneous dividing-molding operations to form individual units for proofing and baking, whereby optimum development, extensibility and gas retention is imparted to the mixed dough during mixing, machining, proof and baking.

8. In a process for the manufacture of leaven bread and rolls independent of a preliminary fermentation step, the steps of mixing essential dough ingredients including flour, water and yeast with about 0.002 to 0.025% by weight of the flour content of a gluten activating agent selected from the group ocnsisting of cysteine, glutathione and sulfite salts and with about 0.001 to 0.01% by weight of the flour content of a gluten maturing agent selected from the group consisting of bromate, iodate and persulfate oxidizing salts, allowing the mixed dough to relax for a relatively short period of the order of 20 to 40 minutes, and immediately thereafter subjecting the relaxed dough to machining operations to form individual units for proofing and baking, whereby optimum development, extensibility and gas retention is imparted to the mixed dough during mixing, machining, proof and baking.

9. A process as in claim 8 wherein said gluten activating agent is L-cysteine hydrochloride.

10. A process as in claim 8 wherein said gluten maturing agent is potassium bromate.

11. In a process for the manufacture of leaven bread and rolls independent of a preliminary fermentation step, the steps of mixing essential dough ingredients including flour, water and yeast with about 0.002 to 0.025% by weight of the flour content of a gluten activating agent selected from the group consisting of cysteine, glutathione and sulfite salts and with about 0.001 to 0.01% by weight of the flour content of a gluten maturing agent selected from the group consisting of bromate, iodate and persulfate oxidizing salts, said mixing continuing for a period of the order of about 10 minutes, allowing the mixed dough to relax for a relatively short period of the order of 20 to 40 minutes, and immediately thereafter subjecting the relaxed dough to machining operations to form individual units for proofing and baking, whereby optimum development, extensibility and gas retention is imparted to the mixed dough during mixing, machining, proof and baking.

12. A process as in claim 11 wherein said dough ingredients include whey solids.

13. A process as in claim 12 wherein at least one of said gluten activating agent and said gluten maturing agent is homogeneously incorporated in said whey solids as a composition for introduction into the mix.

14. As an additive composition adapted to significantly alter dough characteristics independent of a preliminary fermentation step, dried whey solids having homogeneously distributed therethrough about 0.033 to 1.25% by weight of a gluten activating agent selected from the group consisting of cysteine, glutathione and sulfite salts and about 0.017 to 0.4% by weight of a gluten maturing agent selected from the group consisting of bromate, iodate and persulfate oxidizing salts, said composition comprising a chemically stable mixture of said agents and whey solids in accurately balanced weight proportions capable of being subdivided for addition to conventional dough ingredients to form a leaven dough.

15. A composition as in claim 14 wherein said gluten activating agent is L-cysteine hydrochloride.

16. A composition as in claim 14 wherein said gluten maturing agent is potassium bromate.

References Cited in the file of this patent

UNITED STATES PATENTS

| 2,103,443 | Balls et al. | Dec. 28, 1937 |
| 2,492,588 | Marhofer | Dec. 27, 1949 |
| 2,953,460 | Baker | Sept. 20, 1960 |

FOREIGN PATENTS

| 510,367 | Great Britain | Aug. 1, 1939 |

OTHER REFERENCES

"The Fleischmann No-Dough Time Process of Bread Making," The Fleischmann Co., pp. 2-6, copy recd. in the U.S.P.O. prior to Aug. 1, 1939.

"Cereal Chemistry," vol. XXI, No. 4 (July 1944), pp. 241-251.

"Federal Register," Aug. 8, 1950, pp. 5103.

"Baking Science & Technology," 1952, by Pyler, published by Siebel Publishing Co. (Chicago), vol. I, pp. 186-7.

"The Bakers Digest," June 1960, pp. 36, 37, 40, 41 and 42.

"Baking Industry," Aug. 6, 1960, pp. 25, 26 and 27.

UNITED STATES PATENT OFFICE
CERTIFICATE OF CORRECTION

Patent No. 3,053,666　　　　　　　　September 11, 1962

Richard G. Henika et al.

It is hereby certified that error appears in the above numbered patent requiring correction and that the said Letters Patent should read as corrected below.

Column 1, line 30, after "proper" strike out the comma; column 2, line 28, after "i.e.," strike out the closing parenthesis; column 4, line 1, strike out "a"; column 6, lines 1 to 6 of the table should appear as shown below instead of as in the patent:

```
Cysteine HCl ---------------- .002-.020
Potassium bromate¹ --------- .002-.012

Glutathione ----------------- .002-.025
Potassium bromate¹ --------- .002-.010

Sodium bisulfite ------------ .002-.015
Potassium bromate¹ --------- .002-.013
``` column 7, line 8, for "readucing" read -- reducing --; column 8, line 15, for "it" read -- is --; same column 8, in the table, third column, line 5 thereof, for "9.5" read -- 2.5 --; column 9, in the table, first column, line 11 thereof, and in footnote 1, for "L-crysteine", each occurrence, read -- L-cysteine --; same column 9, line 67, for "123" read -- 23 --; column 10, in the table, first column, line 10 thereof, for "L-crysteine" read -- L-cysteine --; same column 10, line 46, for "cut" read -- out --; line 58, for "than" read -- from --; same column 10, line 68, for "for" read -- was --; column 11, line 8, for "supreior" read -- superior --; column 16, line 74, for "cystein, gluthahione" read -- cysteine, glutathione --; line 75, for "sufite" read -- sulfite --; column 17, line 57, for "ocnsisting" read -- consisting --.

Signed and sealed this 19th day of February 1963.

(SEAL)
Attest:

ESTON G. JOHNSON　　　　　　　　DAVID L. LADD
Attesting Officer　　　　　　　　Commissioner of
　　　　　　　　　　　　　　　　　　Patents